US006352661B1

(12) United States Patent
Thompson et al.

(10) Patent No.: US 6,352,661 B1
(45) Date of Patent: Mar. 5, 2002

(54) PMDI WOOD BINDERS CONTAINING HYDROPHOBIC DILUENTS

(75) Inventors: James A. Thompson, Moon Township; Ashok M. Sarpeshkar, Upper St. Clair; James W. Rosthauser, Pittsburgh; Peter H. Markusch, McMurray, all of PA (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/375,963

(22) Filed: Aug. 17, 1999

(51) Int. Cl.$^7$ .................................................. B32B 5/16
(52) U.S. Cl. ...................... 264/109; 264/122; 156/62.2
(58) Field of Search ................................ 264/109, 115, 264/122; 156/62.2, 62.4

(56) References Cited

U.S. PATENT DOCUMENTS

| | | | |
|---|---|---|---|
| 3,666,593 A | 5/1972 | Lee | 156/285 |
| 3,905,934 A | 9/1975 | Gardikes | 260/31.8 T |
| 3,931,088 A | * 1/1976 | Sakurada et al. | |
| 4,100,328 A | 7/1978 | Gallagher | 428/407 |
| 4,293,480 A | 10/1981 | Martin et al. | 260/38 |
| 4,341,668 A | * 7/1982 | Martin et al. | |
| 4,344,798 A | 8/1982 | Gaul et al. | 106/123 LC |
| 4,359,507 A | 11/1982 | Gaul et al. | 428/425.1 |
| 4,393,019 A | 7/1983 | Geimer | 264/83 |
| 4,414,361 A | 11/1983 | Gaul et al. | 524/702 |
| 4,517,147 A | 5/1985 | Taylor et al. | 264/83 |
| 4,546,039 A | 10/1985 | Horacek et al. | 428/357 |
| 4,602,069 A | 7/1986 | Dunnavant | 525/504 |
| 4,609,513 A | 9/1986 | Israel | 264/122 |
| 4,617,223 A | 10/1986 | Hiscock et al. | 428/211 |
| 4,683,252 A | 7/1987 | Dunnavant et al. | 523/143 |
| 4,684,489 A | 8/1987 | Walter | 264/101 |
| 4,850,849 A | 7/1989 | Hsu | 425/407 |
| 4,944,823 A | 7/1990 | Stofko | 156/283 |
| 5,002,713 A | 3/1991 | Palardy et al. | 264/109 |
| 5,008,359 A | 4/1991 | Hunter | 527/103 |
| 5,128,407 A | 7/1992 | Layton et al. | 524/839 |
| 5,140,086 A | 8/1992 | Hunter et al. | 527/103 |
| 5,143,768 A | 9/1992 | Wilderman et al. | 428/68 |
| 5,179,143 A | 1/1993 | König et al. | 524/35 |
| 5,204,176 A | 4/1993 | Seiss et al. | 428/304.4 |
| 5,280,097 A | 1/1994 | Hunter et al. | 527/103 |
| 5,332,458 A | 7/1994 | Wallick | 156/210 |
| 5,426,182 A | 6/1995 | Jenkins et al. | 536/54 |
| 5,674,568 A | 10/1997 | Layton et al. | 427/389.9 |
| 5,744,079 A | 4/1998 | Kimura et al. | 264/109 |

FOREIGN PATENT DOCUMENTS

| | | |
|---|---|---|
| CA | 2043331 | 12/1991 |
| CA | 2143883 | 10/1995 |
| JP | 3-21321 | 1/1991 |

OTHER PUBLICATIONS

Chemical Abstracts, vol. 83, No. 20, Nov. 17, 1975, Columbus, Ohio, US; Abstract No. 165196, XP002153858, Abstract & JP 50 076143 A (Kuraray Co. Ltd) Jun. 21, 1975, "Adhesive Emulsions For Wood".

James B. Wilson's paper entitled, "Isocyanate Adhesives as Binders for Composition Board" which was presented at the symposium "Wood Adhesives–Research, Applications and Needs" held in Madison, Wisconsin on Sep. 23–25, 1980.

\* cited by examiner

*Primary Examiner*—Mathieu D. Vargot
(74) *Attorney, Agent, or Firm*—Joseph C. Gil; N. Denise Brown

(57) ABSTRACT

The present invention relates to a process for producing lignocellulose composite materials by combining lignocellulose particles with a binder composition, followed by molding or compressing the combined lignocellulose particles and binder composition. Suitable binder compositions comprise a polymethylene poly(phenylisocyanate) component and a liquid hydrophobic diluent that is characterized by a flash point of at least 250° F.

15 Claims, No Drawings

PMDI WOOD BINDERS CONTAINING HYDROPHOBIC DILUENTS

BACKGROUND OF THE INVENTION

This invention relates to a process for producing lignocellulose composite materials by combining lignocellulose particles with a binder composition comprising a polymethylene poly(phenylisocyanate) component and a liquid hydrophobic diluent having a flash point above about 250° F., followed by molding or compressing the combined lignocellulose particles and the binder composition.

Composite materials such as oriented strand board, particle board and flake board are generally produced by blending or spraying lignocellulose materials with a binder composition, while the materials are tumbled or agitated in a blender or like apparatus. After blending sufficiently to form a uniform mixture, the materials are formed into a loose mat, which is compressed between heated platens or plates to set the binder and bond the flakes, strands, strips, pieces, etc., together in densified form. Conventional processes are generally carried out at temperatures of from about 120 to 225° C. in the presence of varying amounts of steam, either purposefully injected into or generated by liberation of entrained moisture from the wood or lignocellulose materials. These processes also generally require that the moisture content of the lignocellulose material be between about 2 and about 20% by weight, before it is blended with the binder.

Lignocellulose, according to the present invention used to prepare the lignocellulosic-containing composite articles include wood chips, wood fibers, wood flakes, wood particles, wood wafers, wood shavings, wood flour, sawdust, wood wool, cork, bark, pieces of wood or other comminuted or stranded wood products, and other like products for the wood-working industry. Fibers, particles, etc. from other natural products which are lignocellulosic such as straw, flax residues, bamboo, esparto, dried weeds and grasses, nut shells, sisal fibers, wool, soy, bagasse straw (sugar cane waste), hulls from cereal crops such as corn, rice and oats and the like may be used. These materials may be used in the form of granulates, shavings or chips, fibers, strands, spheres, or powder. In addition, the lignocellulosic materials may be mixed with inorganic flakes or fibrous material such as glass fibers or wool, mica and asbestos, as well as with rubber and plastic materials in particulate form. The lignocellulose may contain a moisture (water) content of up to about 40% by weight, preferably less than 25% by weight, but most preferably contains between 4 and 12% by weight.

Plywood production is accomplished by roll coating, knife coating, curtain coating, or spraying a binder composition onto veneer surfaces. A plurality of veneers are then laid-up to form sheets of required thickness. The mats or sheets are then placed in a heated press and compressed to effect consolidation and curing of the materials into a board.

Binder compositions which have been used in making such composite wood products include phenol formaldehyde resins, urea formaldehyde resins and isocyanates. See, for example, James B. Wilson's paper entitled, "Isocyanate Adhesives as Binders for Composition Board" which was presented at the symposium "Wood Adhesives—Research, Applications and Needs" held in Madison, Wis. on Sep. 23–25, 1980, in which the advantages and disadvantages of each of these different types of binders are discussed.

Isocyanate binders are commercially desirable because they have low water absorption, high adhesive and cohesive strength, flexibility in formulation, versatility with respect to cure temperature and rate, excellent structural properties, the ability to bond with lignocellulosic materials having high water contents, and no formaldehyde emissions. The disadvantages of isocyanates are difficulty in processing due to their high reactivity, adhesion to platens, lack of cold tack, high cost and the need for special storage. U.S. Pat. No. 3,870,665 and German Offenlegungsschrift No. 2,109,686 disclose the use of polyisocyanates (and catalysts therefor) in the manufacture of plywood, fiberboard, compression molded articles, as well as various technical advantages when used as binders.

It is known to treat cellulosic materials with polymethylene poly(phenyl isocyanates) ("polymeric MDI") to improve the strength of the product. Typically, such treatment involves applying the isocyanate to the material and allowing the isocyanate to cure, either by application of heat and pressure (see, e.g., U.S. Pat. Nos. 3,666,593, 5,008,359, 5,140,086, 5,143,768, and 5,204,176) or at room temperature (see, e.g., U.S. Pat. Nos. 4,617,223 and 5,332,458). While it is possible to allow the polymeric MDI to cure under ambient conditions, residual isocyanate groups remain on the treated products for weeks or even months in some instances. It is also known, but generally less acceptable from an environmental standpoint, to utilize toluylene diisocyanate for such purposes.

Isocyanate prepolymers are among the preferred isocyanate materials which have been used in binder compositions to solve various processing problems, particularly adhesion to press platens and high reactivity. U.S. Pat. No. 4,100,328, for example, discloses isocyanate-terminated prepolymers which improve product release from a mold. U.S. Pat. No. 4,609,513 also discloses a process in which an isocyanate-terminated prepolymer binder is used to improve product release. A binder composition in which a particular type of isocyanate prepolymer is used to improve adhesiveness at room temperature is disclosed in U.S. Pat. No. 5,179,143.

A major processing difficulty encountered with isocyanate binders is the rapid reaction of the isocyanate with water present in the lignocellulosic material and any water present in the binder composition itself. One method for minimizing this difficulty is to use only lignocellulosic materials having a low moisture content (i.e., a moisture content of from about 3 to about 8%). This low moisture content is generally achieved by drying the cellulosic raw material to reduce the moisture content. Such drying is, however, expensive and has a significant effect upon the economics of the process. Use of materials having low moisture contents is also disadvantageous because panels made from the dried composite material tend to absorb moisture and swell when used in humid environments.

The problems of the rapid reaction of the isocyanate with water can be aggravated by adding diluents that are hydrophilic or hydroscopic to the isocyanate binder. Addition of these materials to the binder can draw entrained moisture in the wood or in the manufacturing environment to come into more intimate contact with the isocyanate resulting in pre-cure of the resin prior to densification of the mat in the press.

Another approach to resolving the moisture and isocyanate reactivity problem is disclosed in U.S. Pat. No. 4,546,039. In this disclosed process, lignocellulose-containing raw materials having a moisture content of up to 20% are coated with a prepolymer based on a diphenylmethane diisocyanate mixture. This prepolymer has a free isocyanate group content of about 15 to about 33.6% by weight and a viscosity of from 120 to 1000 mPa·s at 25° C. This prepolymer is prepared by reacting (1) about 0.05 to about 0.5 hydroxyl equivalents of a polyol having a functionality of from 2 to 8 and a molecular weight of from about 62 to about 2000 with (2) one equivalent of a polyisocyanate mixture containing (a) from 0 to about 50% by weight of polyphenyl polymethylene polyisocyanate and (b) about 50 to about 100% by weight isomer mixture of diphenylmethane diisocyanate containing 10 to 75% by weight of 2,4'-isomer and 25 to 90% by weight of 4,4'-isomer.

CA Patent Application 2,143,883 discloses polyisocyanate binders for lignocellulose-containing raw materials. These isocyanate binders are low viscosity, isocyanate terminated prepolymers made from a mixture of monomeric and polymeric MDI and an isocyanate-reactive material having at least one hydroxyl group and a molecular weight of from about 62 to about 6,000. These prepolymers are more than tolerant in forming suitable composites with higher moisture levels in the lignocellulose materials ranging from 10 to 50% by weight.

U.S. Pat. No. 5,002,713 discloses a method for compression molding articles from lignocellulosic materials having moisture contents of at least 15%, generally from 15 to 40%. In this disclosed method, a catalyst is applied to the lignocellulosic material. A water resistant binder is then applied to the lignocellulose with catalyst and the coated materials are then compression shaped at a temperature of less than 400° F. to form the desired composite article. The catalyst is a tertiary amine, an organometallic catalyst or a mixture thereof. The binder may be a hydrophobic isocyanate such as any of the polymeric diphenylmethane diisocyanates, m- and p-phenylene diisocyanates, chlorophenylene diisocyanates, toluene diisocyanates, toluene triisocyanates, triphenyl-methane triisocyanates, diphenylether-2,4,4'-triisocyanate and polyphenol polyisocyanates. The catalyst is included to ensure that the isocyanate/water reaction is not slowed to such an extent that the pressing time necessary to produce the molded product is significantly increased.

Pressing of wafer board, oriented strand board, and parallel strand lumber using steam injection and a conventional binder such as a urea-formaldehyde resin or a polymeric diphenylmethane diisocyanate (MDI) is known. Examples of such known pressing processes are disclosed in U.S. Pat. Nos. 4,684,489; 4,393,019; 4,850,849; and 4,517,147. These processes yield a product having satisfactory physical properties if the binder is completely cured.

The completeness of binder cure may, of course, be determined by destructive testing of samples which have been permitted to cure for varying amounts of time under the process conditions. The cure time to be used during the production process is determined on the basis of the sample which had completely cured in the least amount of time. The disadvantages of this method are readily apparent. Valuable product is destroyed in the testing. Further, any variation in wood composition, extent of binder dispersion on the wood particles, etc. or processing conditions which would affect the rate of binder cure are not taken into consideration in the above-described method.

Binding compositions comprising urea extended polyisocyanates derived from a combination of a polyisocyanate and urea which is in solution with water, and the process for preparing the binding compositions is disclosed in U.S. Pat. No. 5,128,407. This reference also describes a process for preparing a composite material from comminuted particles or veneers of a lignocellulose material comprising coating the particles or veneers with these binding compositions.

A process for producing compression molded articles of lignocellulose type materials by use of an organic polyisocyanate compound as a binder is disclosed by U.S. Pat. No. 5,744,079. The binders comprise (A) an organic polyisocyanate such as, for example, MDI or PMDI, (B) an aqueous emulsion of a wax having a melting point ranging from 50° C. to 160° C., (C) an organic phosphate ester derivative, and (D) optionally, water.

It has been known that organic polyisocyanate resins have excellent adhesion properties and workability as the adhesive for thermo-compression molded articles such as particle boards and medium-quality fiber boards produced from a lignocellulose type material such as wood chips, wood fibers, and the articles exhibit excellent physical properties. However, the excellent adhesiveness of the organic polyisocyanate resins causes disadvantage that the compression molded article adheres firmly to the contacting metal surface of the heating plate in a continuous or batch thermo-compression process.

To solve the disadvantages of the undesired adhesion to the heating plate, it is required that a releasing agent is preliminarily sprayed onto the heating plate surface to form a releasing layer. Japanese Patent Publication No. 3-21321 discloses a method different from the external releasing agent spray, in which a mixture of an organic polyisocyanate and a mineral wax is sprayed onto the lignocellulose type material prior to thermo-compression molding. Japanese Patent No. laid open application No. 4-232004 discloses a method of thermo-compression molding of a lignocellulose type material by addition of a neutral ortho-phosphate ester as a compatibilizing agent, the wax and the polyisocyanate.

The large scale industrial manufacture of composite materials which are bonded exclusively with polyisocyanates have previously been limited. The use of some of the polyisocyanates, particularly the better performing isocyanates, such as polymethylene diisocyanate has been limited by their cost. Because of the cost constraints, the level of use of these expensive isocyanates is kept low for a given material. One approach to the use of levels of these isocyanates has involved chain extending the isocyanate with inexpensive extenders.

Isocyanates are known to be suitable components for treating cellulosic fiber and wood products. Some processes for this treatment are described in, for example, U.S. Pat. Nos. 5,179,143 and 5,674,568. The binders of U.S. Pat. No. 5,179,143 comprise polyisocyanates, compounds containing at least two isocyanate reactive hydrogen atoms and alkylene carbonates. The binders for modified cellulosic products of U.S. Pat. No. 5,674,568 comprise a polymethylene poly(phenylisocyanate), water, and an organic compound having a hydroxy functionality of from 2 to 8 and a molecular weight of about 60 to 8000 and being selected from the group consisting of ester group-free polyhydric alcohols, polyether polyols and mixtures thereof.

U.S. Pat. No. 4,414,361 describes adhesive binder compositions for preparing lignocellulosic composite molded articles. The binders comprise a polyisocyanate and a cyclic alkylene ester of carbonic acid such as, for example, propylene carbonate or butylene carbonate. Cyclic alkylene esters of carbonic acid required for the binders of this process have flash points above 250° F., but they are water soluble or water miscible. Addition of these materials can lower the viscosity of the polyisocyanate binder, but they have the disadvantage that they increase the reaction rate of the moisture prior to pressing the mat in the press. Also, these hydrophilic materials remain in the finished lignocellulosic composites and thus may increase the thickness swell of the composite molded articles.

Although these disadvantages are somewhat diminished in areas wherein the time between application of the resin and final curing of it are relatively short and the amount of resin is relatively high, they remain problematic in the typical manufacture of structural lignocellulosic composite products. U.S. Pat. Nos. 5,140,086 and 5,280,097 describe the manufacture of impregnated paper and laminates therefrom wherein the amount of polyisocyanate resin is from about 8 to 20% by weight, based on the weight of the cellulosic material.

It is the purpose of this invention to provide a cost-effective polyisocyanate binder that overcomes the shortcomings of the prior art. Addition of the hydrophobic diluents improves distribution of the binder onto the surface of the lignocellulosic substrate so that the amount of relatively expensive polyisocyanate can be reduced without sacrifice of the physical properties of the composite. Due to the hydrophobic nature of these diluents, pre-cure is not exasperated. The thickness swell of the composites is not increased and in some cases is decreased compared to composites using the same or lesser amounts of the polyisocyanate in the binder component.

SUMMARY OF THE INVENTION

This invention relates to a process for the production of lignocellulose composite materials comprising A) combining lignocellulosic particles with a binder composition, and B) molding or compressing the combination of lignocellulosic particles and the binder composition formed in A). The compressing or molding typically occurs at pressures of from about 200 to 1000 psi (preferably 300 to 700 psi) for about 2 to 10 (preferably 4 to 8) minutes at temperatures of from about 120° C. to 225° C. (preferably 150 to 200° C.). Suitable binder compositions to be combined with the wood particles in step A) comprise:

(1) a polyisocyanate component selected from the group consisting of:
   (a) a polymethylene poly(phenylisocyanate) component having an NCO group content of about 30 to 33%, preferably a polymethylene poly(phenylisocyanate) having a viscosity of less than about 2,000 cps at 20° C., and most preferably a polymethylene poly(phenylisocyanate) having a functionality of about 2.1 to about 3.5, an NCO group content of from about 30% to about 33%, and a monomer content of from about 30% to about 90% by weight, wherein the content of the monomer comprises from up to about 5% by weight of the 2,2'-isomer, from about 1% to about 20% by weight of the 2,4'-isomer, and from about 25% to about 65% by weight of the 4,4'-isomer, based on the entire weight of the polyisocyanate; and
   (b) a semi-prepolymer of a polymethylene poly (phenylisocyanate) having an NCO group content of about 25 to 33%, preferably a semi-prepolymer of a polymethylene poly(phenylisocyanate) having a urethane group content of about 0.5 to 6% and a viscosity of less than about 2,000 cps at 20° C., and being prepared by reacting a polymethylene poly (phenylisocyanate) with polyols or by blending a polymethylene poly(phenylisocyanate) with prepolymers from monomeric methylene bis(phenylisocyanate); and
(2) a liquid hydrophobic diluent having a flash point above 250° F., preferably above 325° F. and most preferably above 375° F., and that is only slightly or negligibly soluble in water, and is preferably insoluble in water.

Suitable binder compositions for the present invention typically comprise from 50 to 95% by weight, preferably from 50 to 80% by weight, and more preferably from 60 to 75% by weight, based on 100% by weight of (1) and (2), of the isocyanate component; and from 5 to 50% by weight, preferably from 20 to 50% by weight, and more preferably from 25 to 40% by weight, based on 100% by weight of (1) and (2), of the liquid hydrophobic diluent.

In accordance with the present invention, wood particles are combined with from about 1.5 to about 7%, preferably 2 to 6% by weight, based on the total weight of the wood composite, of the binder compositions as described above.

DETAILED DESCRIPTION OF THE INVENTION

In the context of the present invention, the term "hydrophobic" is defined as being insoluble, negligibly or only slightly soluble in water. As many manufacturers use these terms without defining limits, as used herein "hydrophobic" refers to compounds that do not dissolve in water or do not dissolve in water in amounts greater than 2% by weight, preferably less than 1% by weight, and most preferably less than 0.1 % by weight at room temperature.

Suitable polyisocyanates to be used as component (1) of the compositions in the present invention include (a) those polymethylene poly(phenylisocyanate) blends having a NCO group content of about 30% to 33% by weight, and preferably having a viscosity of less than about 2,000 cps at 20° C.; and (b) semi-prepolymers of polymethylene poly (phenylisocyanate) having an NCO group content of about 25 to 32%. These semi-prepolymers have a urethane group content of about 0.5 to 6% and a viscosity of less than about 2,000 cps at 20° C. It is preferred that the polymethylene poly(phenylisocyanate) blends and semi-prepolymers of the present invention have a viscosity of from about 20 to about 400 cps at 20° C., and most preferably of from about 40 to about 250 cps at 20° C.

The polyisocyanates of the present invention have a functionality of from about 2.1 to about 3.5, preferably 2.3 to 3.0 and most preferably of 2.6 to 2.8, and an NCO group content of about 30% to about 33%, preferably about 30.5% to about 32.5%, and a monomer content of from about 30% to about 90% by weight, preferably from about 40% to about 70%, wherein the content of monomer comprises up to about 5% by weight of the 2,2'-isomer, from about 1 to about 20% by weight of the 2,4'-isomer, and from about 25 to about 65% by weight of the 4,4'-isomer, based on the entire weight of the polyisocyanate. The polymeric MDI content of these isocyanates varies from about 10 to about 70% by weight, preferably from about 30% to about 60% by weight, based on the entire weight of the polyisocyanate.

A preferred polymethylene poly(phenylisocyanate) blend has a functionality of from 2.2 to 2.4, an NCO group content of from about 31.2 to about 32.8% by weight, and a monomer content of from about 55% to about 80%, wherein the content of monomer comprises no more than about 3% by weight of the 2,2'-isomer, from about 15% to about 20% by weight of the 2,4'-isomer and from about 40% to about 55% by weight of the 4,4'-isomer, based on the entire weight of the polyisocyanate. This polyisocyanate blend comprises from about 20 to about 45% by weight, based on the entire weight of the polyisocyanate, of polymeric MDI.

Most preferred polyisocyanates include, for example, polymethylene poly(phenylisocyanate) blends having an average functionality of from about 2.5 to about 3.0, preferably about 2.6 to about 2.8, an NCO group content of about 30 to 32% by weight, and a monomer content of from about 40 to 50% by weight, wherein the content of monomer comprises no more than about 1% by weight of the 2,2'-isomer, from about 2 to about 10% by weight of the 2,4'-isomer and from about 35 to about 45% by weight of the 4,4'-isomer, based on the entire weight of the polyisocyanate. This isocyanate blend comprises from about 50 to about 60% by weight, based on the entire weight of the polyisocyanate, of polymeric MDI.

Suitable polyisocyanates for component (1)(a) of the present invention also include, for example, mixtures of polyisocyanate blends as described above with adducts of MDI including, for example, allophanates of MDI as described in, for example, U.S. Pat. Nos. 5,319,053, 5,319,054 and 5,440,003, the disclosures of which are herein incorporated by reference, and carbodiimides of MDI as described in, for example, U.S. Pat. Nos. 2,853,473, 2,941,966, 3,152,162, 4,088,665, 4,294,719 and 4,244,855, the disclosures of which are herein incorporated by reference.

Polymeric isocyanates prepared from residues of the toluene diisocyanate production process may optionally be included in the binder composition of the present invention. Such residues are described, for example, in U.S. Pat. No. 5,349,082, the disclosure of which is herein incorporated by reference.

Suitable semi-prepolymers of polymethylene poly (phenylisocyanate) to be used as component (1)(b) of the present invention include those semi-prepolymers having an NCO group content of 25 to 30% by weight. These semi-prepolymers have a urethane group concentration of about 0.5 to 6% and a viscosity of less than about 2,000 cps at 20° C. Typically, suitable semi-prepolymers can be prepared by reacting a polymethylene poly(phenylisocyanate), i.e., component (1)(a) above, with a polyol, or by blending the polymethylene poly(phenylisocyanate), component (1)(a) above, with a prepolymer of monomeric methylene bis (phenylisocyanate) as described in, for example, U.S. Pat. Nos. 5,462,766 and 5,714,562, the disclosures of which are herein incorporated by reference.

It is also possible to prepare suitable semi-prepolymers from a mixture of monomeric and polymeric MDI, component (1)(a) above, and an isocyanate-reactive material having at least one hydroxyl group and a molecular weight of from about 62 to about 6,000. These isocyanate-terminated prepolymers are formed by reacting a polyisocyanate mixture and an isocyanate-reactive compound having from about 1 to about 8 hydroxyl groups and a molecular weight of from about 62 to about 6,000 in amounts such that the ratio of equivalents of hydroxyl groups to isocyanate groups is from about 0.001:1 to about 0.20:1, preferably from about 0.004:1 to about 0.1:1. The polyisocyanate mixture must be a mixture of polymeric MDI and a mixture of MDI isomers.

The polyisocyanate mixture may be produced in accordance with any of the techniques known in the art. The isomer content of the diphenylmethane diisocyanate may be brought within the required ranges, if necessary, by techniques which are well known in the art. One technique for changing isomer content is to add monomeric MDI to a mixture of MDI containing an amount of polymeric MDI which is higher than desired.

The isocyanate-reactive compound which is used to produce the semi-prepolymers of the present invention must have at least one hydroxyl group, preferably from about 2 to about 8 hydroxyl groups, and most preferably from about 2 to about 4 hydroxyl groups and a molecular weight of from about 62 to about 8,000, preferably from about 100 to about 5,000, most preferably from about 100 to about 2,000. Any of the known isocyanate-reactive materials having at least 1 hydroxyl group satisfying these criteria may be used. Suitable isocyanate-reactive materials include but are not limited to any of the known polyesters and polyethers.

Polyesters which may be used to produce the prepolymers of the present invention include the reaction products of polyhydric (preferably dihydric) alcohols with polybasic (preferably dibasic) carboxylic acids, polycarboxylic acid anhydrides or polycarboxylic acid esters of lower alcohols. The polycarboxylic acid may be aliphatic, cycloaliphatic, aromatic and/or heterocyclic and may optionally be substituted (e.g., by halogen atoms) and/or unsaturated. Specific examples of suitable carboxylic acids and their derivatives are succinic acid, glutaric acid, adipic acid, suberic acid, azelaic acid, sebacic acid, phthalic acid, isophthalic acid, terephthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid anhydride, dimerized and trimerized unsaturated fatty acids (optionally in admixture with monomeric unsaturated fatty acids such as oleic acid), terephthalic acid dimethyl ester and terephthalic acid-bis-glycol ester. Specific examples of suitable alcohols are 1,2-propylene glycol, 1,3-propylene glycol, 1,4-butylene glycol, 2,3-butylene glycol, 1,6-hexanediol, 1,8-octanediol, neopentyl glycol, 1,4-bis-hydroxymethyl cyclohexane, 2-methyl-1,3-propanediol, glycerol, trimethylol propane, 1,2,6-hexanetriol, 1,2,4-butanetriol, trimethylol ethane, pentaerythritol, quinitol, mannitol, 1,4-cyclohexanedimethylol, sorbitol, formitol, methyl glycoside, diethylene glycol, triethylene glycol, tetraethylene glycol, higher polyethylene glycols, dipropylene glycol, higher polypropylene glycols, dibutylene glycol and higher polybutylene glycols. The polyester may contain terminal carboxyl groups or a small portion of monofunctional ester capped functionalities. Polyesters of lactones (e.g., ε-caprolactone) or of dihydroxy carboxylic acids (e.g., ω-hydroxy caproic acid) may also be used.

Preferred polyesters are prepared from mixtures of phthalic, isophthalic and terephthalic acids with ethylene glycol, diethylene glycol and higher polyethylene glycols. The materials are often obtained in the recycling process for plastic bottles.

Polyethers which may be used to produce the prepolymers of the present invention may be produced, for example, by polymerizing epoxides themselves in the presence of a Lewis acid catalyst or by the addition of an epoxide to starter components containing reactive hydrogen atoms such as water, alcohols, ammonia or amines. Epoxides which may be used include ethylene oxide, propylene oxide, butylene oxide, tetrahydrofuran, styrene oxide and epichlorohydrin. Ethylene oxide, propylene oxide and combinations thereof are particularly preferred.

Specific examples of suitable starter components include: ethylene glycol, 1,3-propylene glycol, 1,2-propylene glycol, trimethylol propane, glycerol, sorbitol, 4,4'-dihydroxy diphenyl propane, aniline, ethanolamine, substituted ethanolamines such as methyl ethanolamine and methyl diethanolamine, ethylene diamine, and sucrose. The starter component may be used alone or in admixture with other starter components.

Preferred polyethers are polypropylene oxide adducts started on an amine such as ammonia, ethylene diamine, and substituted ethanolamines.

The polyisocyanate mixture and isocyanate-reactive material used to produce the semi-prepolymers of the present invention are each used in quantities such that the ratio of equivalents of hydroxyl groups to isocyanate groups is from about 0.001:1 to about 0.20:1, preferably from about 0.004 to about 0.1:1, most preferably from about 0.005 to about 0.02.

The semi-prepolymers of the present invention may be prepared by reacting the polyisocyanate mixture and hydroxyl compound at temperatures of from about 10 to about 250° C., preferably from about 60 to about 120° C. for a period of from about 1 to about 1500 minutes, preferably from about 30 to about 200 minutes.

Other materials which may optionally be used in the production of the semi-prepolymers of the present invention include polycarbonates, ester carbonates and ether carbonates containing isocyanate-reactive hydrogen atoms.

The semi-prepolymers of the present invention are characterized by a viscosity of less than 2,000 cps at 20° C., preferably a viscosity of less than 1,000 cps at 20° C. These prepolymers also have an NCO (i.e., isocyanate group) content of from about 25 to about 33%.

In accordance with the present invention, it is preferred that the semi-prepolymers used as component (1)(b) have an NCO group content of about 27 to 31%, a urethane group content of about 1 to about 4%, and a viscosity of less than about 1,000 cps at 20° C.

Viscosity of the semi-prepolymers may be reduced by adding the hydrophobic diluents of the present invention. It is preferred that the viscosity of the mixtures of the (1)(b) semi-prepolymers and (2) hydrophobic diluents be in the range of 10 to 2,000 cps, preferably 50 to 1,000 cps, and most preferably 100 to 700 cps.

Suitable liquid hydrophobic diluents to be used as component (2) in the present invention include those compounds having a flash point above 250° F., preferably above 325° F. and most preferably above 375° F. and that are only slightly soluble in water or have negligible solubility in water, and preferably insoluble in water. Some examples of suitable liquid hydrophobic diluents include compounds such as, for example, aromatic sulfonamides, aromatic phosphate esters, alkyl phosphate esters, dialkylether aromatic esters, dialkylether diesters, polymeric polyesters, polyglycol diesters, polyester resins, alkyl alkylether diesters, aromatic diesters, aromatic triesters, aliphatic diesters, alkylether monoesters, alkyl monoesters, halogenated hydrocarbons, chlorinated paraffin, aromatic oils often used as processing aids, and phthalates often used as plasticizers including, for example, dialkyl phthalates, etc.

In the context of the present invention, hydrophobic diluents are defined as those that are not soluble in water or water is not soluble in them in amounts greater than 2% (pbw), preferably less than 1% and most preferably less than 0.1%. Although less preferred, it is possible to add a small portion of diluents that are not hydrophobic provided that the amount of these present does not increase the thickness swell of the lignocellulosic composites prepared using the binders of the present invention. Illustrative examples of diluents that are not hydrophobic would be the cyclic carbonates including ethylene-, propylene-, and butylene-carbonate, ethers, ketones, and alkyl acetates.

It is also possible, but less preferred, to add a portion of diluent in which the polyisocyanate binder is not fully miscible, providing that the mixture of diluents solubilizes the binder. Illustrative examples of these materials include paraffinic oils, and napthenic oils containing a minimum of about 50% saturated hydrocarbon radicals, or in other words, those containing less than about 50% aromatic compounds.

Suitable aromatic compounds are typically blends of high boiling aryl, alkylaryl and arylalkyl hydrocarbons obtained from coal tar or in the distillation of petroleum or in the recovery from the solvent extracts of petroleum-based products. Included are hydrogenated, partially-hydrogenated and non-hydrogenated light and heavy cracked distillates, napthenic oils, and paraffinic oils. These materials typically are comprised of complex mixtures of arylalkyl, alkylaryl, and polycyclic aromatic compounds containing these substituents. Illustrative examples of alkylaryl hydrocarbons are octylphenyl-, nonylpheny-, and dodecylphenyl-substituted aromatic and polycyclic aromatic compounds. Illustrative examples of arylalkyl hydrocarbons include phenyihexyl- and napthyidodecyl-substituted aromatic hydrocarbons. Illustrative examples of aryl and polycyclic aromatic compounds include substituted napthalenes, anthracenes, phenanthrenes, pyrenes, perylenes, coronenes, and the like. Examples of hydrogenated aromatic compounds include substituted dihydronapthalenes, tetralins and their higher ring analogues. Examples of other aromatic compounds include substituted fluorenes, fluoranthrenes, biphenyl, and further substituted biphenyl compounds. The aromatic compounds of the present invention are seldom separated and are most often obtained as blends with varying amounts of the individual components. The boiling points for the individual components range between about 150° C. and about 500° C. The components typically have carbon numbers from about $C_9$ to about $C_{36}$ and often contain from about four to six condensed unsaturated rings.

Some suitable phthalates to be used as component (2) in accordance with the present invention include compounds such as, for example, diisobutyl phthalate, dibutyl phthalate, di-2-ethylhexyl azelate, di-2-ethylhexyl phthalate, dibutyl sebacate, diphenyl octyl phosphate, dioctyl phthalate, di-2-ethylhexyl sebacate, diphenyl-2-ethylhexyl phosphate, dioctyl azelate, dioctyl sebacate, diisodecyl phthlate, etc., wherein phthalate denotes the ortho-, meta- and para-isomers and mixtures thereof. Other suitable compounds to be used as diluents in the present invention include 2,2,4-trimethyl-1,3-pentanediol monoisobutyrate, 2,2,4-trimethyl-1,3-pentanediol diisobutyrate, 2,2,4-trimethyl-1,3-pentanediol dipropionate, 2,2,4-trimethyl-1,3-pentanediol dibutyrate, 2,2,4-trimethyl-1,3-pentanediol dicaproate, 2,2,4-trimethyl-1,3-pentanediol dicaprionate, 2,2,4-trimethyl-1,3-pentanediol dioctanoate, etc.

Preferred diluents for the present process include dioctyl phthalate, di-2-ethylhexyl phthalate, 2-hydroxybenzenesulfonic acid esters and 4-hydroxybenzenesulfonic acid esters which contain, for example, from 1 to 24 carbon atoms in the ester group. It is preferred that these contain from 6 to 16 carbon atoms in the ester group, and most preferred that these contain from 8 to 12 carbon atoms in the ester group. Some examples of suitable diluents include compounds such as, for example, Mesamoll (CAS RN=39406-18-3), a processing oil, commercially available from Bayer AG. Viplex 885, a petroleum distillate blend, commercially available from Crowley Chemical Corporation (CAS RN=64741-81-7) as an aromatic hydrocarbon oil that it typically used as a processing oil, is a preferred diluent.

Known catalysts for accelerating the isocyanate addition reaction may in principle be used in forming these lignocellulosic composite materials. Suitable catalysts for this purpose include tin compounds such as dibutyl tin dilaurate or tin(II) octoate. Other catalysts are described in "Kunstoff Handbuch", Volume VII, published by Becker and Braun, Carl Hanser Verlag, Munich, 1983 on pages 92–98. The catalysts are used, if at all, in a quantity of about 0.001 to 10% by weight, preferably about 0.002 to 0.1% by weight, based on the total quantity of reactants.

Other optional additives and/or auxiliary agents which may be included in the binder compositions of the present invention include, for example, wax emulsions or slack wax for reduced water absorption, preservatives, surface active additives, e.g., emulsifiers and stabilizers, mold release agents such as, for example, zinc stearate, and other soaps, etc.

Suitable lignocellulose particles to be used in the present invention include, for example, wood chips, wood fibers, wood flakes, wood particles, wood wafers, wood shavings, wood flour, sawdust, wood wool, cork, bark, pieces of wood or other comminuted or stranded wood products, and other like products for the wood-working industry. Fibers, particles, etc. from other natural products which are lignocellulosic such as straw, flax residues, bamboo, esparto, dried weeds and grasses, nut shells, sisal fibers, wool, soy, bagasse straw (sugar cane waste), hulls from cereal crops such as corn, rice and oats and the like may be used. These materials may be used in the form of granulates, shavings or chips, fibers, strands, spheres, or powder. In addition, the lignocellulosic materials may be mixed with inorganic flakes or fibrous material such as glass fibers or wool, mica and asbestos, as well as with rubber and plastic materials in particulate form. The lignocellulose may contain a moisture (water) content of up to about 40% by weight, preferably less than about 25% by weight, but most preferably contains between 4 and 12% by weight.

Preferred lignocellulose materials for the present invention are wood flakes, wood wafers, strips or strands of wood, and pieces of wood.

In general, the isocyanate component (1) and the hydrophobic diluent (2) are mixed by normal batch mixing processes using low shear or high shear mixers known to those skilled in the art. In-line or continuous mixing devices including, for example, pin mixers, static mixers., etc. are also suitable for the presently claimed invention.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

The components of the systems illustrated in these examples are:

Isocyanate A: a polymeric MDI (PMDI) blend having a viscosity of about 200 mPa·s at 25° C., and an isocyanate content of about 31.5%. Commercially available from Bayer Corporation as Mondur® 541.

Diluent A: an aromatic hydrocarbon blend that is commercially available under the name Viplex® 885, from Crowley Chemical Company. It is a hydrocarbon distillate with a viscosity of 105 mPa·s at 25° C.

Diluent B: a phthalic acid derivative, having a viscosity of 56 mPa·s at 25° C. This substance is commercially available from Eastman Kodak Company under the name Kodaflex® DOP.

Diluent C: a light paraffinic distillate solvent extract with a viscosity of 58 mPa·s at 25° C. This substance is commercially available from Sun Company under the name Sundex® 840.

Diluent D: propylene carbonate, a liquid chemical reagent with a viscosity of 35 mPa·s at 25° C. It is soluble in water up to about 8% at room temperature. This substance is commercially available from Sigma Aldrich, under its common chemical name, propylene carbonate.

Diluent E: a chlorinated paraffin with a viscosity of about 50 mPa·s at 20° C. This substance is available from Ferro Chemical under the name Klorowax® 40-40.

Diluent F: a chlorinated paraffin with a viscosity of about 1400 mPa·s at 20° C. This substance is available from Ferro Chemical under the name Klorowax® 60-50.

Diluent G: an alkyl sulfonic ester of phenol, which is characterized by a viscosity of about 120 mPa·s at 20° C. This substance is available from Bayer AG under the commercial name Mesamoll®.

Procedure for Preparation of Isocyanate/Hydrophobe Diluent Binders

Isocyanate A was added to a glass jar and combined with the hydrophobic diluents in the ratios listed in Tables 1 and 2 below. The binder samples were allowed to mix at 1000-rpm mixing speed for roughly 15 minutes, after which time the mixtures were all visually determined to be homogeneous.

Procedure for Preparation of Particleboard Panels

Particleboard furnish was placed in a stainless steel bowl (for use in a KitchenAid KSM90 mixer). The stainless bowl was transferred to the KitchenAid mixer and the binder mixture was added in a continuous dropwise addition, over a period of five minutes, with the mixer running at its lowest speed setting. The furnish was mixed for an additional 10 minutes to evenly distribute the binder. The resin-coated furnish was then placed in an eight inch by eight-inch form. The form was then placed in a PHI Hydraulic Press (PW-22 Series), and pressed to stops of one half inch panel thickness, heating to 350° F. and pressing for 4½ minutes.

The resultant samples were evaluated for Internal Bond Strength and Thickness Swell in accordance with ASTM method D 1037: "Evaluating Properties of Wood-Base Fiber and Particle Panel Materials".

Procedure for Preparation of Oriented Strandboard Panels

Oriented strandboard furnish was sifted through a screen to remove undersized and irregular strands, with the optimal furnish stored in a fiberboard box. The furnish was weighed into two 30-gallon plastic containers, and placed into a Coil Manufacturing Systems Rotary blender. Isocyanate binder mixture was weighed into a holding container in the blender, as was Casco-wax (available from Borden Chemical, Inc.). Isocyanate was added as per the examples listed in Table 3 below, and wax was added at 1% w/w to the OSB furnish. The rotary blender was then started, and the isocyanate and wax were evenly distributed on the furnish for a period of ten to fifteen minutes. The resin and wax-coated strands were then replaced into the 30 gallon containers, for transfer to a form. The strands were then evenly distributed by hand into the form in a preset weight amount, and the form removed from the distributed strands, which now form a mat. During this time, the press, a Newman Hydra-Press Model HP-188, was heated to working temperature, and a burst of steam was sent through the heated platens of the press to remove any built-up water in the lines. The mat was placed between two metal platens, and transferred to the Newman press. Probes were then inserted into the pre-pressed mat to measure internal temperature and internal pressure. The board was then pressed under 100 psi steam pressure with 600 psi of pressure on the mat for 2.5 minutes, resulting in the finished 1.5 inch thick board.

The resultant boards were tested for Internal Bond Strength and Thickness Swell in accordance with ASTM method D1037: "Evaluating Properties of Wood-Base Fiber and Particle Panel Materials".

TABLE 1

| Example # Diluent and % by Wt. % | 1 Comparative: Diluent A - 0% | 2 Diluent A - 20% | 3 Diluent A - 35% | 4 Diluent A - 40% | 5 Diluent A - 50% |
|---|---|---|---|---|---|
| Particleboard Furnish (g)[1] | 373.24 | 370.43 | 363.29 | 373.27 | 363.29 |
| Isocyanate A (g)[1] | 18.48 | 14.62 | 11.77 | 11.09 | 9.06 |
| Diluent A (g)[1] | 0 | 3.7 | 6.34 | 7.39 | 9.06 |
| Total Weight in form (g)[1] | 356.1 | 353.38 | 346.73 | 349.43 | 346.73 |
| Moisture of Furnish (Wt. %)[2] | 6.30 | 5.50 | 5.58 | 6.31 | 5.58 |
| Board Density (lb/ft$^3$)[3] | 40.2 | 40.4 | 41.4 | 40.1 | 40.6 |
| Internal Bond Strength (psi)[4] | 240 | 265 | 234 | 202 | 158 |
| Thickness Swell (%)[5] | 10.5 | 10.9 | 13.7 | 10.6 | 14.9 |

[1]: All recorded sample weights are the average of values obtained from a series of five samples.
[2]: Furnish moisture is obtained as per ASTM method E871-82.
[3]: Board density results are obtained from the average of five boards.
[4]: Internal Bond Strength, or IB values, are obtained from the average of two boards, with each board cut into nine equal sections. Hence, each resultant value is the average of 18 different analyses.
[5]: Thickness Swell values are obtained as the average of two board's analyses.

TABLE 2

| Example # Diluent and % by Wt. % | 6 Diluent B - 29% | 7 Diluent C - 20% | 8 (Comparative) Diluent D - 35% | 9 Diluent E - 30% | 10 Diluent F - 30% |
|---|---|---|---|---|---|
| Particleboard Furnish (g)[1] | 364.29 | 363.12 | 363.29 | 363.12 | 363.12 |
| Isocyanate A (g)[1] | 18.48 | 14.49 | 11.77 | 12.68 | 12.68 |
| Diluent A (g)[1] | 0 | 0 | 0 | 0 | 0 |
| Diluent B (g)[1] | 7.39 | 0 | 0 | 0 | 0 |
| Diluent C (g)[1] | 0 | 3.62 | 0 | 0 | 0 |
| Diluent D (g)[1] | 0 | 0 | 6.34 | 0 | 0 |
| Diluent E (g)[1] | 0 | 0 | 0 | 5.43 | 0 |
| Diluent F (g)[1] | 0 | 0 | 0 | 0 | 5.43 |
| Total Weight in form (g)[1] | 354.68 | 346.57 | 346.73 | 346.57 | 346.57 |
| Total Weight in form (g)[1] | 354.68 | 346.57 | 346.73 | 346.57 | 346.57 |
| Moisture of Furnish (Wt. %)[2] | 5.97 | 5.53 | 5.58 | 5.53 | 5.53 |
| Board Density (lb/ft$^3$)[3] | 41.5 | 40.3 | 41.8 | 40.1 | 40.4 |
| Internal Bond Strength (psi)[4] | 222 | 205 | 227 | 197 | 185 |
| Thickness Swell (%)[5] | 11.8 | 11.7 | 16.1 | 14.0 | 13.9 |

Notes:
[1]: All recorded sample weights are the average of values obtained from a series of five samples.
[2]: Furnish moisture is obtained as per ASTM method E871-82.
[3]: Board density results are obtained from the average of five boards.
[4]: Internal Bond Strength, or IB values, are obtained from the average of two boards, with each board cut into nine equal sections. Hence, each resultant value is the average of 18 different analyses.
[5]: Thickness Swell values are obtained as the average of two boards' analyses.

TABLE 3

| Example # Diluent and % by Wt. | 11 Control | 12 Diluent G - 29% |
|---|---|---|
| OSB Furnish (g)[1] | 17757.33 | 17757.33 |
| Isocyanate A (g)[1] | 837.61 | 837.61 |
| Diluent G (g)[1] | 0 | 335.0 |
| Wax Added (g) | 167.52 | 167.52 |
| Total Weight in form (g)[1] | 17056.78 | 17056.78 |
| Moisture of Furnish (Wt. %)[2] | 6.00 | 6.00 |
| Board Density (lb/ft$^3$)[3] | 42 | 42 |
| Internal Bond Strength (psi)[4] | 122 | 136 |
| Thickness Swell (%)[5] | 5.7 | 4.4 |

Notes:
[1]: Sample weight was obtained from one OSB panel.
[2]: Furnish moisture is obtained as per ASTM method E871-82.
[3]: Board density results are obtained from the average of all board pieces analyzed.
[4]: Internal Bond Strength, or IB values, are the average of eight different sample pieces analyzed.
[5]: Thickness Swell values are obtained as the average of two boards' analyses.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of lignocellulose composite materials comprising:
   A) combining lignocellulose particles with 1.5 to 7% by weight, based on the total weight of the lignocellulose composite, of a binder composition comprising:
      (1) 50 to 95% by weight, based on 100% by weight of (1) and (2), of an isocyanate component selected from the group consisting of:
         (a) a polymethylene poly(phenylisocyanate) having an NCO group content of from about 30 to 33% by weight, and
         (b) a semi-prepolymer of polymethylene poly(phenylisocyanate) having an NCO group content of from about 25 to 32% by weight; and
      (2) 5 to 50% by weight, based on 100% by weight of (1) and (2), of a liquid hydrophobic diluent having a flash point above 250° F., and which is only slightly or negligibly soluble in water; and
   B) molding or compressing the combination formed in A), thus forming the lignocellulose composite material.

2. The process of claim 1, wherein the lignocellulose particles are combined with 2 to 6% by weight, based on the total weight of the lignocellulose composite of a binder composition.

3. The process of claim 1, wherein said binder composition comprises:
   (1) 50 to 80% by weight, based on 100% by weight of (1) and (2), of an isocyanate component, and
   (2) 20 to 50% by weight, based on 100% by weight of (1) and (2), of a liquid hydrophobic diluent.

4. The process of claim 1, wherein said binder composition comprises:
   (1) 60 to 75% by weight, based on 100% by weight of (1) and (2), of an isocyanate component, and
   (2) 25 to 40% by weight, based on 100% by weight of (1) and (2), of a liquid hydrophobic diluent.

5. The process of claim 1, wherein said liquid hydrophobic diluent has a flash point above 325° F.

6. The process of claim 1, wherein said liquid hydrophobic diluent has a flash point above 375° F.

7. The process of claim 1, wherein said liquid hydrophobic diluent is insoluble in water.

8. The process of claim 1, wherein the molding or compressing occurs at pressures of from 200 to 1,000 psi for about 2 to 10 minutes, at temperatures of from about 245 to about 430° F.

9. The process of claim 8, wherein the pressure is from 300 to 700 psi for about 4 to 8 minutes, at temperatures of from about 300 to about 430° F.

10. The process of claim 1, wherein (1)(a) said polymethylene poly(phenyl isocyanate) having an NCO group content of from about 30 to 33% by weight has a viscosity of less than about 2,000 cps at 20° C.

11. The process of claim 1, wherein (1)(a) said polymethylene poly(phenyl isocyanate) having an NCO group content of from about 30 to 33% by weight, a functionality of about 2.1 to about 3.5, and a monomer content of from about 30% to about 90% by weight, wherein the content of monomer comprises up to about 5% by weight of the 2,2'-isomer, from about 1 to about 20% by weight of the 2,4'-isomer, and from about 25 to about 65% by weight of the 4,4'-isomer, based on the entire weight of the polyisocyanate.

12. The process of claim 1, wherein (1)(b) said semi-prepolymer has a urethane group content of about 0.5 to 6% and a viscosity of less than about 2,000 cps at 20° C.

13. The process of claim 11, wherein (1)(b) said semi-prepolymer is prepared by reacting a polymethylene poly(phenylisocyanate) with one or more polyols, or by blending a polymethylene poly(phenyisocyanate) with prepolymers prepared from monomeric methylene bis(phenylisocyanate).

14. The process of claim 1, wherein (2) said liquid hydrophobic diluent is selected from the group consisting of (i) a hydroxyl benzenesulfonic acid ester containing from 1 to 24 carbon atoms in the ester group, (ii) a phthalate diester containing from 8 to 24 carbon atoms in the ester groups, and (iii) a petroleum distillate blend.

15. The process of claim 14, wherein said petroleum distillate blend comprises heavy thermal cracked petroleum distillate.

* * * * *